United States Patent [19]

Kawai et al.

[11] Patent Number: 5,286,324
[45] Date of Patent: Feb. 15, 1994

[54] POLYTETRAFLUOROETHYLENE RESIN POROUS MEMBRANE, SEPARATOR MAKING USE OF THE POROUS MEMBRANE AND METHODS OF PRODUCING THE POROUS MEMBRANE AND THE SEPARATOR

[75] Inventors: Takashi Kawai; Tomoko Katsu; Toshio Yoshioka, all of Otsu, Japan

[73] Assignee: Toray Industries, Inc., Tokyo, Japan

[21] Appl. No.: 918,060

[22] Filed: Jul. 24, 1992

Related U.S. Application Data

[62] Division of Ser. No. 358,205, May 30, 1989, Pat. No. 5,158,680.

[30] Foreign Application Priority Data

| Jul. 30, 1987 | [JP] | Japan | 62-193322 |
| Jul. 30, 1987 | [JP] | Japan | 62-193323 |
| Nov. 13, 1987 | [JP] | Japan | 62-287627 |

[51] Int. Cl.$^5$ .............................................. B32B 31/00
[52] U.S. Cl. ................................... 156/155; 156/296; 264/49; 264/127
[58] Field of Search ................ 156/155, 166, 296; 264/49, 127; 429/247, 249; 210/450, 500.23, 500.36, 321.61, 493.2, 500.21

[56] References Cited

U.S. PATENT DOCUMENTS

| 3,518,335 | 6/1970 | Sklarchuk et al. | 264/49 X |
| 3,661,645 | 5/1972 | Strier et al. | 264/49 X |
| 3,953,566 | 4/1976 | Gore . | |
| 4,049,589 | 9/1977 | Sakane | 264/49 X |
| 4,096,227 | 6/1978 | Gore . | |
| 4,100,238 | 7/1978 | Shinomura | 264/49 |
| 4,154,688 | 5/1979 | Pall . | |
| 4,269,712 | 5/1981 | Hornby et al. | 156/166 X |
| 4,770,778 | 11/1987 | Yokoyama et al. . | |
| 4,874,516 | 10/1989 | Kondo . | |

FOREIGN PATENT DOCUMENTS

| 42-3691 | 2/1942 | Japan . |
| 48-20780 | 3/1973 | Japan . |
| 59-5037 | 1/1984 | Japan . |
| 60-53153 | 3/1985 | Japan . |
| 61-129006 | 6/1986 | Japan . |
| 62-45302 | 2/1987 | Japan . |

*Primary Examiner*—Jeff H. Aftergut
*Attorney, Agent, or Firm*—Fish & Richardson

[57] ABSTRACT

Disclosed are a porous membrane which is made from a material containing, as its main component, a polytetrafluoroethylene resin, and a method of producing a porous membrane comprising forming a hollow or sheet-like film from a mixture of a polytetrafluoroethylene resin dispersion and a fiber-forming polymer, heat-treating the film at a temperature not lower than the melting temperature of the resin, and removing the fiber-forming polymer. Production of polytetrafluoroethylene porous membranes of a variety of pore sizes and porosities is possible by suitably varying the type and amount of additives added to an original liquid. The membrane finds spreading use in the field of separation in high-temperature and strong decomposing or strong dissolving mediums.

15 Claims, 8 Drawing Sheets

POLYTETRAFLUOROETHYLENE RESIN POROUS MEMBRANE, SEPARATOR MAKING USE OF THE POROUS MEMBRANE AND METHODS OF PRODUCING THE POROUS MEMBRANE AND THE SEPARATOR

This application is a division of U.S. application Ser. No. 07/358,205, filed May 30, 1989, now U.S. Pat. No. 5,158,680, which is a continuation of PCT application Ser. No. PCT/JP88/00755, filed Jul. 28, 1988.

TECHNICAL FIELD

The present invention relates to a novel polytetrafluoroethylene resin porous membrane suitable for use in the condensation and separation of substances by, for example, ultrafiltration, micro filtration and so forth as well as to a separator making use of this porous membrane and methods of producing the porous membrane and the separator.

BACKGROUND ART

Hitherto, porous membranes of cellulose acetates, polyethylenes, polypropylenes, polymethylmethacrylates, polyacrylonitriles and polysulfones have been used in processes such as reverse osmosis, ultrafiltration, micro filtration and so forth. Unfortunately, however, these known porous membranes are still unsatisfactory because of disadvantageous heat-resistance and chemical-resistance properties, in particular anti-alkali, anti-acid and anti-solvent properties.

The specifications of the U.S. Pat. Nos. 3,953,566 and 4,096,227 disclose methods in which a non-sintered PTFE resin blend containing a liquid lubricant is extruded at a high temperature and the extruded material is drawn and heated to about 327° C. or above, whereby a polytetrafluoroethylene resin porous membrane is formed. These methods, however, suffer from inferior performance of the product due to pore controllability of the porous structure or inferior membrane-formability which results in an impractically large thickness of the product membrane.

Accordingly, an object of the present invention is to provide a PTFE resin porous membrane which is free from these problems of the prior art, as well as a separator which makes use of this porous membrane and which exhibits superior heat- and chemical-resistance properties with an extremely small rate of eluation.

DISCLOSURE OF THE INVENTION

The present invention provides a porous hollow fiber membrane made mainly from a polytetrafluoroethylene resin.

The present invention also provides a method of producing a porous membrane comprising: forming a film having a hollow construction or a sheet-like construction from a polytetrafluoroethylene resin dispersion and a fiber- or film-forming (referred to "film-forming" hereinunder) polymer; heat-treating the film at a temperature not lower than the melting point of the resin; and removing the film-forming polymer.

The "membrane" of the present invention means the porous membrane obtained from the above film by removing the film-forming polymer.

The present invention further provides a membrane-type separator comprising: a separator case; a porous membrane made mainly from a polytetrafluoroethylene resin; and a fluoro-resin sealing material with which an end of the separator case is sealed.

The present invention further provides a method of producing a separator comprising: forming a film having a hollow construction or a sheet-like construction from a mixture of a polytetrafluoroethylene resin dispersion and a film-forming polymer; heat-treating the film at a temperature not lower than the melting point of the resin; and effecting the following steps (1) and (2) in either order on the heat-treated film:
(1) removing the film-forming polymer, and
(2) mounting the film or membrane and sealing an end of the case with a fluoro-resin so as to form flow channels through the membrane.

DETAILED DESCRIPTION OF THE INVENTION

Figure 1:
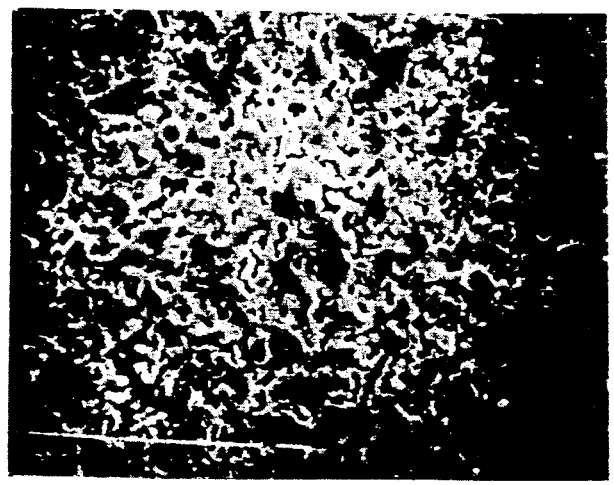
FIG. 1 shows a scanning electronic microscopic photograph (magnification 1600) of the surface of a porous membrane of Example 1 which has been kept in contact with a glass sheet.

The present invention will be described in more detail hereinafter.

The PTFE resin used in the invention is a tetrafluoroethylene homopolymer or a copolymer which contains not less than 50 mol %, preferably not less than 60 mol % and more preferably not less than 80 mol % of tetrafluoroethylene in terms of monomer unit, e.g., a tetrafluoroethylene-perfluoroalkylvinylether copolymer, a tetrafluoroethylene-hexafluoropropylene copolymer, a tetrafluoroethylene-ethylene copolymer and so forth, or their mixture.

In the production processes according to the invention, the PTFE resin material is used in the form of an aqueous dispersion or an organic solvent dispersion, preferably in the form of an aqueous dispersion formed by an emulsification polymerization in an aqueous medium containing a surfactant or a liquid formed by condensing such an aqueous dispersion. More specifically, the dispersion contains PTFE resin particles of a particle size not greater than 1 $\mu$, preferably not greater than 0.8 $\mu$, uniformly dispersed therein.

The film-forming polymer used in the present invention generally covers all polymers and which are capable of providing a film-forming mixture when mixed with the PTFE resin dispersion. When an aqueous dispersion liquid is used, a viscose (cellulose sodium xanthate), a polyvinylalcohol or a sodium alginate is preferably used as the film-forming polymer, independently or in the form of a mixture thereof.

The mixing ratio of the film-forming polymer to the PTFE resin varies depending on the type of the film-forming polymer used in the invention. The above-mentioned mixing ratio, however, preferably ranges between 10 and 200 wt %, more preferably between 30 and 100 wt %. Porous membranes having mean pore size of 0.01 $\mu$ or greater cannot be obtained when the mixing ratio of the film-forming polymer is less than 10 wt %. On the other hand, a mixing ratio exceeding 200 wt % reduces the mechanical strength of the formed membrane to an-impractically low level.

According to the present invention, it is preferred to add an additive or additives for the purpose of improving porosity and film-formability when the PTFE resin dispersion and the film-forming polymer are mixed with each other.

Any additive which can be removed by heat-decomposition, extraction, dissolution or radioactive decomposition may be used as the above-mentioned additive. For instance, one or more of the following additives are suitably used: a silicate such as calcium silicate or aluminum silicate; a carbonate such as calcium carbonate or magnesium carbonate; a phosphate such as sodium phosphate or calcium phosphate; an acetate; an oxalate; a chloride such as ammonium chloride; a sulfate such as sodium sulfate or barium sulfate; a nitrate; a weak or strong acid salt such as a perchlorate; a powdered metal such as iron powder; a metal oxide such as alumina, zirconia or magnesium oxide; a pulverized inorganic material such as pulverized silicate, kaolin clay and diatomaceous earth; a pulverized resin such as of polyamide, polyester, polyolefin, polysulfone, polyvinyl chloride, polyvinylidene fluoride or polyvinyl fluoride; and a heat-resistant organic material such as silicone oil, hexafluoropropylene oxide oligomer, chlorotrifluoroethylene oligomer, phthalic acid ester, trimellitic acid ester, sebacic acid ester, adipic acid ester, azelaic acid ester or phosphoric acid ester.

It is also possible to add a commercially available surfactant or a de-foaming agent for the purpose of improving the stability of the film-forming mixture and improving fiber-formability.

The total amount of the additive or additives used in the present invention varies depending on factors such as the types of the additive or additives, types of the PTFE resin and the types of the film-forming polymer. In general, however, the total amount of the additive or additives is preferably 1000 wt % or less based on the weight of the PTFE resin, because the mechanical strength of the product membrane is impractically lowered when the additive or additives are added in excess of 1000 wt %.

On the other hand, no appreciable effect in the control of the porous structure cannot be produced when the amount of the additive or additives is below 10 wt %.

Thus, the amount of the additive or additives preferably ranges between 30 and 700 wt %, more preferably between 50 and 500 wt % based on the weight of the PTFE resin.

The mixing of the PTFE resin dispersion liquid and the film-forming polymer is preferably conducted at a temperature not higher than 100° C., because mixing at temperatures above 100° C. causes aggregation of the resin particles in the dispersion liquid and the additive or additives, resulting in a clogging of a filter during film formation or in lack of uniformity of the structure of the formed film. The mixing temperature, therefore, is 80° C. or less, preferably 60° C. or less and more preferably 40° C. or less.

According to the invention, the uniform mixture is subjected to a film forming process which is executed by rolling, extrusion or a combination thereof. The uniform mixture is prepared in the form of a liquid which exhibits a viscosity level of 10 to 10,000 poise, preferably 100 to 5000 poise, at the film forming temperature.

The concentration of the PTFE resin in the uniform mixture varies depending on factors such as the types of the film-forming polymer and additive as used, forming method and so on. In general, however, the PTFE resin concentration ranges between 1 and 50 wt %, preferably 5 and 30 wt %.

The membrane in the present invention can have the form of a sheet, a tube or a hollow fiber, among which the hollow fiber is most preferred because it provides a large effective area per unit volume and because it permits the size of the apparatus and the production cost to be reduced advantageously.

For instance, the film is formed by spreading a film formable mixture on the surface of a flat plate such as a sheet of a glass or a metal or on the surface of a continuous belt and then coagulating the spread material by drying or by dipping the same in a coagulating liquid. The also may be formed by extruding a film formable mixture through a slit into a coagulating liquid directly or indirectly through the air. A method also is usable in which a film formable mixture is extruded together with a core of a non-coagulative or coagulative fluid from a spinneret for spinning a hollow fiber into a coagulating liquid directly or indirectly through the air so as to coagulate the formable mixture. Alternatively, a fiber forming material is extruded together with a core of a coagulating liquid into a non-coagulative fluid directly or indirectly through the air, thereby coagulating the film formable mixture.

The type of the non-coagulative fluid cannot be definitely determined because it depends on the type of the film-forming polymer. Generally, however., the non-coagulative fluid is suitably selected from substances such as water, glycerol, ethylene glycol, polyethylene glycol, liquid paraffin, isopropylmyristate, freon and their mixtures, as well as from gases such as air, nitrogen, and inert gases.

Spinneret temperature also depends on the viscosity of the material liquid and, hence, cannot de definitely determined, though it generally ranges between 20° and 120° C. It is also preferred that the spinneret is maintained at or above a temperature which is 20° C. below the coagulating liquid temperature. Such a spinneret temperature is effective in preventing deterioration in the spinning characteristics caused by condensation of vapor on the spinneret surface which is serious particularly when the distance between the spinneret surface and the coagulation liquid surface is small.

When the extruded film formable mixture is introduced into the coagulating liquid indirectly via the air, it is preferred from the view point of film forming stability that the distance from the spinneret surface to the coagulation liquid surface ranges between 0.2 and 200 cm. In this case, the temperature of the air is the same as the ambient air temperature or the room temperature. In some cases, however, the air may be cooled to a lower temperature.

The type of the coagulating liquid varies depending on the type of the film-forming polymer as used. In general, however, the following substances are usable as the coagulating liquid independently or in the form of a mixture: an aqueous solution of an inorganic salt such as sodium sulfate, ammonium sulfate, zinc sulfate, potassium sulfate, calcium sulfate, copper sulfate, magnesium sulfate, aluminum sulfate, calcium sulfate, magnesium chloride, zinc chloride or the like; and an acid such as sulfuric acid, hydrochloric acid, nitric acid, acetic acid, oxalic acid, boric acid or the like. The temperature of the coagulating liquid is a factor which significantly affects film formability and is generally selected to range between 0° and 98° C.

The heat-treatment in the present invention can be carried out at the melting point of the PTFE resin or higher temperature in various types of atmosphere such as vacuum, air, nitrogen, oxygen, sulfur gas, helium gas or silicone oil. The heat-treatment may be conducted with or without tension applied to the material, either in a batch mode or a continuous mode. Various methods are adoptable such as a method in which the material is treated in a free state without being fixed, a method in which the material is drawn and fixed to a treating frame in advance of the heat-treatment, and a method in which the treatment is conducted while fixing the material on a treating frame with a given length or shrinkage, or a-method in which these methods are suitably combined to treat the material continuously.

The drawing may be effected before, after or during the heat-treatment. Too large a drawing ratio causes the pores to be undesirably elongated in the drawing direction or the pore size becomes uncontrollable with the result that the product membrane becomes unreliable in terms of permeability. From this point of view, the drawing factor or ratio is determined to range between 1.1 and 3. The drawing temperature also is selectable within the range between the room temperature and the heat-treating temperature. The drawing may be conducted not only uni-axially but also bi-axially.

One of the critical features of the present invention resides in that the film-forming polymer is removed from the film after the heat-treatment. The film-forming polymer, however, may have changed its nature as a result of the heat-treatment.

The removal of the film-forming polymer or the additive from the formed material film after the heat-treatment may be effected by a suitable method such as dissolution, decomposition or a combination thereof, by means of a liquid, gas, heat or radioactive rays. The removal may be conducted in a batch-mode or in a continuous mode. Alternatively,.the removal may be effected after installation of the formed material in a module or an element.

Various removing methods are usable depending on the types of the film-forming polymer and the additive. In general, however, a method can conveniently be used in which the film after the heat-treatment is dipped in a liquid which is composed mainly of an acid such as sulfuric acid, nitric acid, hydrochloric acid, perchloric acid or fluoric acid alone or in the form of a mixture thereof or an alkali such as sodium hydroxide or potassium hydroxide alone or in the form of a mixture thereof. Alternatively, this liquid is circulated through a module or an element loaded with the film.

The removal of the film-forming polymer conducted after installing the formed material in a module or an element encounters difficulty in the removal of the polymer in the regions where the film is fixed by welding, often resulting in presence of a trace amount of residual polymer. Therefore, where there is a strict demand for elimination of eluate, it is advisable that the film-forming polymer is removed from the edge portions of the heat-treated material before the fixing of the same by welding to the module or the element.

It is also possible to subject the thus formed membrane to a drawing so as to improve properties such as the permeability, mechanical strength and dimensional stability. The drawing factor or ratio is about 1.1 to 3, while the drawing temperature usually ranges between the room temperature and the melting point of the PTFE resin.

The membrane of the present invention can be used in a dry state. However, according to the present invention, since the PTFE resin is hydrophobic, it is necessary that the membrane is subjected to a treatment for rendering the fine pores hydrophilic. In such a case, the membrane may be stored in the wetted state after the treatment. The wetness can be maintained by allowing deposition of various wetting agent such as water-containing glycerol, ethylene glycol, polyethylene glycol, various surfactants, and so forth.

The porous membrane according to the present invention preferably has no substantial orientation of the shapes of pores when viewed on a plane parallel to the membrane surface. More specifically, the ratio of the maximum value of the mean pore size as measured uni-directionally to the mean pore size as measured in the orthogonal direction is not greater than 5, preferably not greater that 3.

The membrane can have a composite construction composed of a fine structure layer and a support layer. The size and number of the pores in the fine structure layer, as well as the thickness of the same, are important factors which significantly affect the water permeability and solute blocking ratio of the membrane.

The membrane of the invention with the composite structure may have at least one fine structure layer on the surface of the membrane. In such a case, the layer thickness which rules the permeation speed is reduced as compared with the case where the membrane is formed of the fine structure layer alone. In this case, a sharp dividing separating characteristic with a high permeability is obtained by supplying a liquid to be treated from the same side as the fine structure layer. In addition, it is possible to remove any gel layer formed on the surface of the fine structure layer, by applying a pressure to the reverse side of the membrane, thus proving a superior backwash characteristic. In addition, there is no risk of delamination of the fine structure layer from the support layer, because the fine structure layer has been formed on the surface of the support membrane simultaneously with the formation of the support layer.

The support layer has a multiplicity of pores having a mean pore size greater than 2 $\mu$, preferably between 2 and 20$\mu$, as measured in a plane parallel to the membrane surface. In addition, the support layer is formed integrally and continuously with the fine structure layer and serves to bear mechanical load applied thereto. The pores of the support-layer need not always be arranged isotropically. The pores of the support layer may have forms elongated in the thicknesswise direction of the membrane with their longitudinal axes having lengths not smaller than 20$\mu$. Preferably, however, the pores are shaped without any substantial orientation when viewed in a plane parallel to the membrane surface. More specifically, the ratio of the maximum value of the mean pore sizes measured uni-directionally to the mean pore size measured in the orthogonal direction is not greater than 5, preferably not greater than 3.

It is also preferred that the porosity of the membrane of the present invention is not smaller than 20%.

Any resin having a melting point which is not higher than the melting point of the resin as the porous membrane material can be used as a bonding resin for fixing the edges of the porous membrane. Thus, a fluoro-resin, an olefin resin, an imide resin, an acrylonitrile resin, an amide resin or an ester resin can suitably be used as the bonding resin.

When an extremely small rate of eluate and specifically high heat- and chemical-resistances are required, the following fluoro-resins are preferably used as the bonding resin, as well as the PTFE resin having a melting point of about 327° C.: tetrafluoroethylene-perfluoroalkylvinylether copolymer resin (melting point about 306° C.); tetrafluoroethylene-hexafluoropropylene copolymer resin (melting point about 270° C.); tetrafluoroethylene-ethylene copolymer resin (melting point about 260° C.); vinylidene fluoride polymer resin (melting point about 174° C.); chlorotrifluoroethylene polymer resin (melting point about 211° C.). More preferably used are a combination of a PTFE resin porous membrane (melting point about 327° C.) and the same resin, a combination of the PTFE resin porous membrane and a tetrafluoroethylene-perfluoroalkylvinylether copolymer resin (melting point about 306° C.), and a combination of the PTFE resin porous membrane and a tetrafluoroethylene-hexafluoropropylene copolymer resin (melting point about 270° C.), as well as a combination of a porous membrane of tetrafluoroethyleneperfluoroalkylvinylether copolymer resin (melting point about 306° C. and a tetrafluoroethylene-hexafluoropropylene copolymer resin (melting point about 270° C.). The bonding resin may be used in various forms such as pellets, powder, sheet, dispersion and so forth.

The method of the present invention for producing a separator comprises: (1) removing the film-forming polymer from the formed material after a heat-treatment; and (2) fixing by welding edges of the film by means of a PTFE resin. The removal of the film-forming resin may be executed in advance of the fixing or, alternatively, after the fixing.

The nature of the film-forming polymer may have been changed from the initial state, as a result of the heat-treatment.

The film after the heat-treatment contains film-forming polymer filling fine pores so as to produce a reinforcement effect. Therefore, no substantial change is caused in the shape and the porous structure of the film even when the film is heated to a temperature above the melting point of the PTFE resin. This effect can be enjoyed when the method of the invention is carried out such that the removal of the film-forming polymer is conducted after the fixing the edges of the film.

There is no restriction in the fixing of the formed material by welding. For instance, the heating for welding may be effected only on the edge of the formed material or over the entire length of the separator. The welding heat can be applied by various means such as a heating iron, a heater of various type, an oven, a supersonic bonder, and so forth. In order to achieve a high sealing effect at the weld region, it is preferred that the welding is conducted under an increased or decreased pressure or, alternatively, under application of vibration or centrifugal force.

When the film has a pipe-like form, tubular form or a hollow fiber form, the following measures are preferably taken in order to prevent deformation or collapse of the formed material. For instance, a suitable reinforcer such as a rod, wire, filament or fiber of a metal, glass or a ceramic is inserted into the internal hollow or cavity. Alternatively, a resin filler or an adhesive which is molten at the heating temperature is charged into desired portion of the hollows or cavities. After the production of a module by welding, the bar or the filler is removed by pulling, chemical decomposition or extraction.

In a preferred form of the method of the invention for producing a separator, a plurality of hollow fibers are prepared and each hollow fiber is coated at its ends with a fine resin powder. The coated ends of each fiber are heated so that the fibers are fixed one by one so as to form a fiber bundle. The thus obtained fiber bundle is set in a housing together with a fine resin powder and a sheet such that the fibers are mechanically clamped. Then, heat is applied so as to weld the fiber bundle to the housing.

In another preferred form of the method of the invention, a housing is disassembled in halves to each of which a bundle of fibers is welded and then the halves of the housing are assembled together to complete the module. Alternatively, a fiber bundle is formed by arraying a plurality of hollow fibers in a side-by-side fashion with the ends of the fibers coated with a fine resin powder. The coated ends of the fibers are sandwiched between sheets of the same resin as the fine powder and pressure and heat are applied to the sheets so that the fibers are hermetically welded at their ends to each other and to the sheets, whereby an assembly resembling a reed-screen is prepared. This assembly is then rolled and set in a housing and then heat and pressure are applied to the ends of the fiber bundle so as to weld the fibers again so as to provide seals between both sheets and the sheets and the housing.

Although the invention does not pose any restriction on the form of the module, the hollow-fiber type module is preferred because it can withstand higher filtration pressure as compared with other types of module such as pleats-type module, spiral-type module and tubular-type module. In addition, this type of module provides a greater effective area per unit volume so that the size and cost can be reduced economically. For these reasons, the hollow-fiber type module can be used in various fields and, hence, is preferred. From the view point of easiness of handling and use, the module is preferably constructed such that the fiber bundle is arranged straight and sealed at its both ends or such that the bundle is bent in a U-shaped form and sealed at one side of the module.

Figure 22:
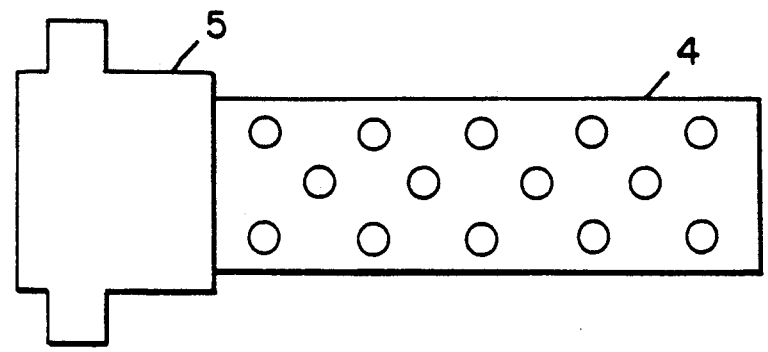
FIG. 22 shows an appearance of an example of a separator element of hollow fiber module type.
Figure 23:
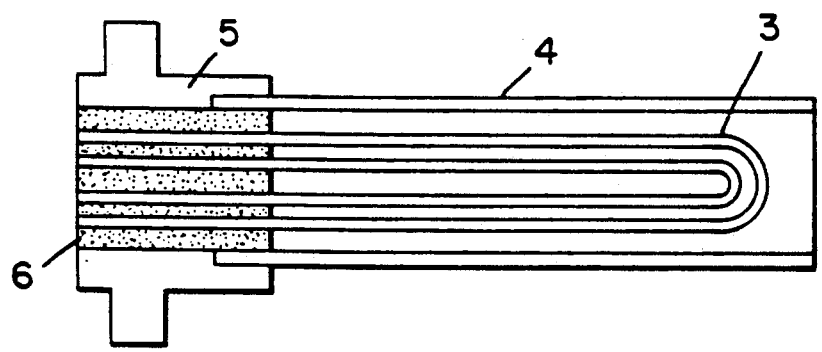
FIG. 23 is a sectional view of an example of an element, in which 3 denotes hollow fibers, 4 denotes a protective cover, 5 denotes a housing seal member, and 6 denotes a fixing resin.

FIG. 22 shows the appearance of a hollow fiber module as an embodiment of the separator in accordance with the present invention, while FIG. 23 is a cross-sectional view of the element shown in FIG. 22.

The hollow fiber module according to the present invention has a plurality of hollow fibers 3 arranged in the form of a bundle and, covered by a protective cover 4 the ends of the hollow fibers 3 being fixed through welding with a housing seal member 5 and a fixing resin 6.

The porous membrane module according to the present invention finds a use. More specifically, the porous membrane module can be used in the following fields: production of highly purified water or chemicals of high degrees of purity used in the semiconductor industry; collection of effluents from defatting process or electrodeposition process; treatment of waste liquids in various industrial processes such as paper-making processes, oil-water separation process, oily emulsion separation process, and so forth; separation and refining of fermented products; condensation, separation and refining in various food industries such as condensation of fruit and vegetable juices, processing of soybeans, production of sugar, and so forth; medical uses such as artificial kidney, micro-filler for separation of blood components and bacteria, and separators refiners for medical drugs; biotechnological devices such as a bioreactor; electrodes of a fuel battery; and so forth.

The separator making use of the porous membrane of the present invention features an extremely small rate of eluation, as well as excellent heat- and-chemical-resistances, thanks to the use of the PTFE resin as the material of the porous membrane and the porous membrane module. In addition, a porous membrane having a reduced thickness can be produced without difficulty. Moreover, a separation membrane having a variety of pore size distribution can be obtained by adding an additive or by changing the composition of the mixture. In the production of the separator, the process for forming the porous membrane can be incorporated in the process for forming a separator module. Although some examples are shown below, it is to be noted that they are only illustrative and are not intended for limiting the scope of the invention.

Factors employed in the following description of Examples were respectively measured in accordance with the following methods:

(1) Dimensions of Membrane

Dimensions of the membrane were measured by observation through an optical microscope.

(2) Size of Pores in Membrane

The pore size was measured by photographic observation through a scanning electronic microscope (Model $\alpha$-9, produced by Akashi Seisakusho).

(3) Porosity

The porosity was calculated in accordance with the following formula:

$$(W - W_0) \times 100/V \ (\%)$$

where, W represents the weight of the membrane as measured when the pores were filled with purified water by ethanol substitution method, $W_0$ represents the absolute dry weight of the membrane, and V represents the volume of the membrane.

(4) Water Permeability

In case of a sheet-type membrane, the membrane was incorporated in a commercially available cartridge and a hydrostatic pressure was applied to the membrane while the membrane was maintained at 37° C. The water permeability was then calculated from the amount of water permeating through the membrane in a given time, effective membrane area and the pressure differential across the membrane.

In case of a hollow fiber type module, the fibers were assembled to form a compact module and a hydrostatic pressure was applied to the interior of the fibers while the fibers were maintained at 37° C. The water permeability was calculated from the amount of water which has permeated through the membrane, effective area of the membrane and the pressure differential across the membrane.

(5) Filtration Performance on 5% Aqueous Solution of Albumin

Water permeability was measured by the same method as (3) described above, by making use of a commercially available cow blood serum (Fraction V). Then, the albumin blocking rate was calculated in accordance with the following formula:

$$(Co-C)\times 100/Co\ (\%)$$

where, Co represents the concentration of the original liquid, while C represents the concentration of the liquid permeated through the membrane.

EXAMPLE 1

Figure 2:
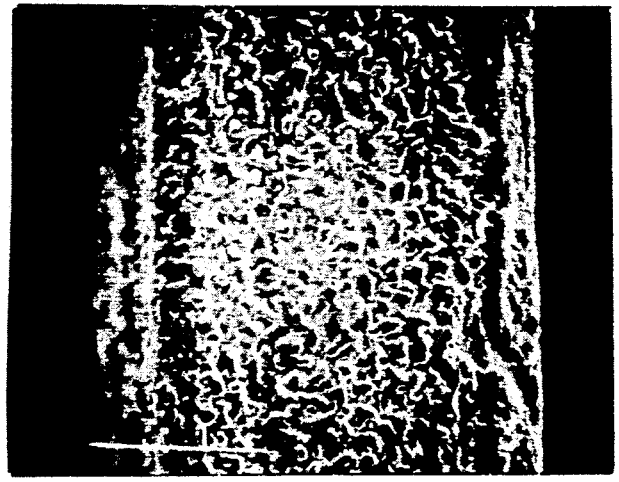
FIG. 2 shows a scanning electronic microscopic photograph (magnification 560) of the structure exhibited by a sectional surface of the porous membrane of Example 1.
Figure 3:
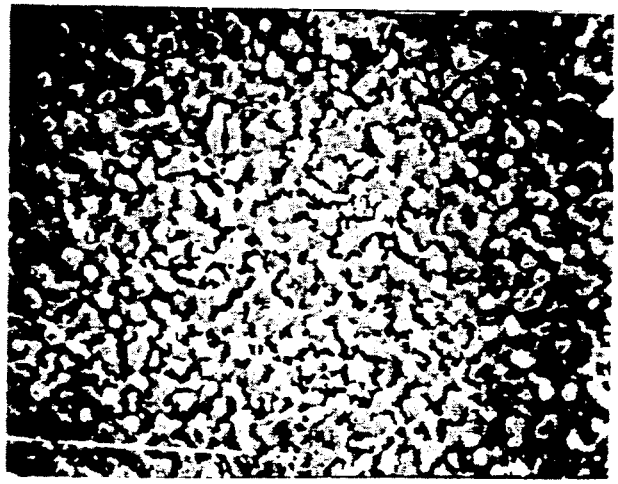
FIG. 3 shows a scanning electronic microscopic photograph (magnification 1600) of the surface of a porous membrane of Example 1 which has been kept in direct contact with a coagulation liquid.

50 parts of sodium alginate (Produced by Nakarai Kagaku-sha, 300 cps) were dissolved in 950 parts of refined water at 70° C. so as to form a uniform liquid. Then, 200 parts of aqueous dispersion of PTFE (D-2 produced by Daikin: solid content 61 wt %, surfactant 5.7 wt %) and 13 parts of a silicone oil (SH-200 produced by Toray Silicone) were added to the above-mentioned liquid. The liquid was then stirred at 70° C. so that a uniform original liquid was prepared. This original liquid had a viscosity of about 290 poise at 40° C. The original liquid was then spread on a glass sheet at 40° C. and, immediately thereafter, immersed in 40 wt % of aqueous solution of calcium chloride heated to 40° C. for 5 minutes. The liquid glass sheet was then dipped in water of the room temperature, whereby a flat-sheet type film was formed. The thus obtained film was heated in a hot-air oven and heat-treated for 30 minutes at 340° C. Then, the film was kept whole overnight in a mixture of the room temperature containing about 70 wt % of sulfuric acid and about 30 wt % of nitric acid so as to remove the sodium alginate, silicone oil and denaturation product formed therefrom as a result of the heat-treatment. The membrane was then rinsed with water, whereby a porous membrane was obtained. The structure of this membrane is shown in FIGS. 1, 2 and 3. As will be seen from these Figures, the membrane had three-dimensional reticulated or network structure with multiplicity of pores of 0.5 to 1.0 μ in and under the surfaces thereof.

This membrane had a porosity of about 20% and a thickness of about 110 μ in the wetted condition. The permeability to purified water was 310 ml/m²·hr·mmHg, while the permeation performance test conducted with 5% albumin aqueous solution showed a water-permeability of 24 ml/m²·hr·mmHg and an albumin blocking rate of 66%.

EXAMPLE 2

Figure 4:
FIG. 4 shows a scanning electronic microscopic photograph (magnification 4000) of the structure of the outer surface of a porous hollow fiber membrane of Example 2.
Figure 5:
FIG. 5 shows a scanning electronic microscopic photograph (magnification 800) of the structure exhibited by a sectional surface of the porous hollow fiber membrane of Example 2.
Figure 6:
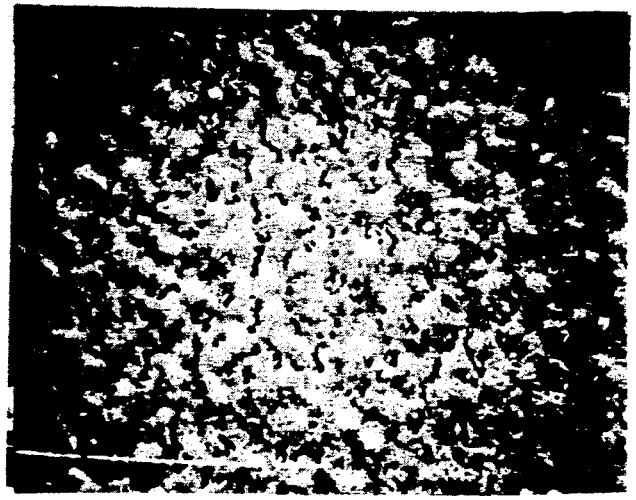
FIG. 6 shows a scanning electronic microscopic photograph (magnification 1600) of the structure of the inner surface of the porous hollow fiber membrane of Example 2.

The original liquid used in Example 1 was extruded through a hollow-fiber spinneret of 40° C. together with a core liquid which was about 10 wt % aqueous solution of calcium chloride. The extruded liquid was made to run 5 cm through the air and was introduced into a coagulating bath of about 50° C. consisting of about 40 wt % aqueous solution of calcium chloride so as to be coagulated. The fiber thus formed by coagulation was rinsed with water and was wound up at a speed of 20 m/min. The thus formed fiber was heated at 340° C. for 30 minutes in a hot air oven and was then kept whole overnight in a mixture liquid of the room temperature containing about 70 wt % of sulfuric acid and about 30 wt % of nitric acid, so as to remove the sodium alginate and silicone oil, as well as the denaturation products formed therefrom as a result of the heat-treatment. The fiber was then rinsed with water to wash away any residue, whereby a porous membrane of hollow fiber was obtained. The structure of this membrane is shown in FIGS. 4, 5 and 6. As will be seen from these Figures, the membrane had a three-dimensional reticulated or network structure with pores of 0.5 to 1.0 μ in and under the surfaces thereof.

This membrane had a porosity of about 22% as well as an inside diameter of about 360 μ and a thickness of about 70 μ in wetted condition. The permeability to purified water was 36 ml/m²·hr·mmHg, while the permeation performance test conducted with 5% albumin aqueous solution showed a water-permeability of 7.4 ml/m²·hr·mmHg and an albumin blocking rate of 66%.

Stainless steel filaments of 100 mm long were inserted to both open ends of the hollow fiber to a depth of about 50 mm. 400 pieces of such fibers were bent in a U-like form to form a bundler. The end of this bundle, 50 mm in length, was dipped for 15 seconds in an aqueous dispersion (D-2 produced by Daikin: solid content 61 wt % and surfactant content 5.7 wt %) of PTFE (melting point 327° C.). The wetted end of the hollow fiber bundle was then dried at the room temperature so that a thin membrane was formed on the surfaces of the hollow fibers of the bundle. The dipping and drying were repeated five times in total so that a coating membrane of the resin was uniformly formed on the surfaces of the hollow fibers. The coated portion of the fiber bundle was then clamped with a jig of a stainless steel with the intermediary of PTFE films (melting point 327° C.) and heat was applied only to the end of the fiber bundle in a concentrated manner by means of a heat gun, whereby the polymer was molten to fix the hollow fibers. Then, after removing the jig, a PTFE film (melting point 327° C.) was wound on the welded portion of the hollow fiber bundle and a housing seal member of PTFE was fitted on the membrane. Heat was applied once again with the heat gun concentrically to the end of the fiber bundle, whereby the seal member was fixed to the fiber bundle.

Subsequently, the bundle of the hollow fibers was sliced at its end to which the seal member was fixed, so that an element was obtained in which the hollows of the fibers were opened. The thus obtained element was immersed in ethanol for 2 hours for the purpose of a hydrophilic treatment, followed by an air leak test. No leakage was observed at the sealed portion of the element. After the treatment for realizing the hydrophilic nature of the element, water permeability was measured by applying water pressure of 1 kg/cm² from the outer side of the fibers. A water permeability level of 38 ml/min was confirmed.

EXAMPLE 3

400 pieces of heat-treated hollow fibers, prepared by the same manner as Example 2 through the 30 minute heat-treatment at 340° C., were bundled in a U-like form. The end of the bundle, 50 mm in length, was kept whole through a night in a mixture liquid of room temperature containing about 70 wt % of sulfuric acid and about 30 wt % of nitric acid so as to remove the sodium alginate and the silicone oil, as well as denaturation product of the sodium alginate and the silicone oil formed as a result of the heat-treatment. Then the bundle was rinsed with water and stainless steel filaments of 100 mm long were inserted into the hollows of the filaments to a depth of 50 mm. Then, the end of the fiber bundle, 50 mm in length, was gently dipped in an aqueous dispersion (D-2 produced by Daikin: solid content 61 wt % and surfactant content 5.7 wt %) of PTFE (melting point 327° C.) and kept therein for 15 seconds, followed by drying at the room temperature, whereby a thin membrane of the resin was formed on the surface of the hollow fiber bundle. The dipping and drying were repeated five times in total so that a coating membrane of the resin was uniformly formed on the surfaces of the hollow fibers. The coated portion of the fiber bundle was then clamped with a jig of a stainless steel with the intermediary of PTFE films (melting point 327° C.). The hollow fiber bundle was then heated in an electric oven at 340° C. so that the resin was molten to weld and fix the hollow fibers. Then, after removing the jig, a PTFF film (melting point 327° C.) was wound on the welded portion of the hollow fiber bundle and a housing seal member of PTFE was fitted on the membrane. The bundle was then heated to 340° C. in a vacuum atmosphere, whereby the seal member was fixed to the fiber bundle.

Subsequently, the bundle of the hollow fibers was sliced at its end to which the seal member was fixed, so that an element was obtained in which the hollows of the fibers were opened. The thus obtained element was kept whole overnight in a room-temperature mixture liquid containing about 70 wt % of sulfuric acid and about 30 wt % of nitric acid, so as to remove the sodium alginate and the silicone oil, as well as the denaturation products thereof formed as a result of the heat-treatment. The element was then immersed in ethanol for 2 hours for the purpose of a hydrophilic treatment, followed by an air leak test. No leakage was observed at the sealed portion of the element. After the treatment for realizing the hydrophilic nature of the element, water permeability was measured by applying water pressure of 1 kg/cm$^2$ from the outer side of the fibers. A water permeability level of 38 ml/min was confirmed.

EXAMPLE 4

Figure 7:
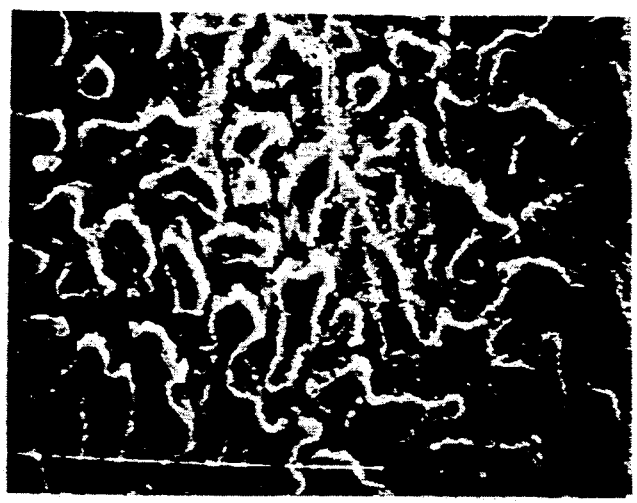
FIG. 7 shows a scanning electronic microscopic photograph (magnification 1600) of the structure of the outer surface of a porous hollow fiber membrane of Example 3.
Figure 8:
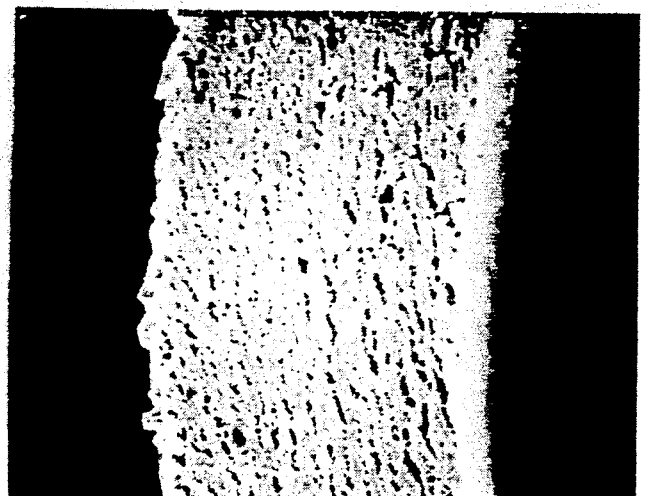
FIG. 8 shows a scanning electronic microscopic photograph (magnification 800) of the structure exhibited by a sectional surface of the porous hollow fiber membrane of Example 3.
Figure 9:
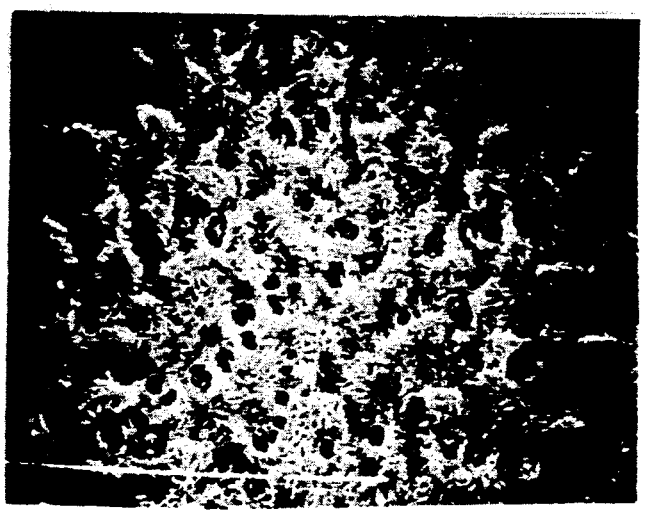
FIG. 9 shows a scanning electronic microscopic photograph (magnification 1600) of the structure of the inner surface of the porous hollow fiber membrane of Example 3.

The wetted porous hollow fiber membrane-after the acid cleaning and water rinsing in Example 2 was drawn at a ratio of 1.5. The structure of the membrane is shown in FIGS. 7, 8 and 9. As shown in these Figures, a fine structure layer with pores of 0.5 to 1.0 $\mu$ in pore size was formed on the surface of the membrane. The size of the pores in-and under the surface of the membrane ranged between 0.3 and 2.0 $\mu$.

The porosity of the hollow fiber membrane was about 40%. The inside diameter and the thickness of the wetted hollow fiber membrane were about 330 $\mu$ and about 67 $\mu$, respectively. The permeability to purified water was 259 ml/m$^2$·hr·mmHg, while a permeability performance test conducted with 5% aqueous solution of albumin showed water permeability of 50 ml/m$^2$·hr·mmHg and an albumin blocking rate of about 38%.

COMPARISON EXAMPLE 1

A flat sheet membrane and a hollow fiber membrane were prepared in the same manners as Examples 1 and 2, except that the heat-treating temperature was changed to 310° C. These membranes were kept whole through a night in a room-temperature mixture liquid containing about 70 wt % of sulfuric acid and about 30 wt % of nitric acid so as to remove the sodium alginate and the silicone oil, as well as denaturation products thereof formed as a result of the heat-treatment. After the removal of these substances, the membranes could not support themselves and collapsed.

EXAMPLE 5

400 pieces of the porous hollow fibers after the acid cleaning and water rinsing in Example 2 were bundled and bent in a U-like form. The end of this bundle, 50 mm in length, was gently dipped for 15 seconds in an aqueous dispersion (solid content 50 wt %, viscosity 20 cp, specific gravity 1.4) of a tetrafluoroethylene-hexafluoropropylene copolymer (melting point 270° C.), followed by drying at the room temperature so that a thin membrane of the resin was formed on the surfaces of the hollow fibers. The dipping and drying were repeated 5 times so that a coating membrane of the resin was uniformly formed on the surface of the hollow fibers. Subsequently, the portion of the fiber bundle coated with this coating membrane was clamped with a stainless steel jig through the intermediary of films of the tetrafluoroethylene-hexafluoropropylene copolymer (melting point 270° C.) and the bundle thus clamped was heated in an electric oven at 320° C., whereby the resin was molten to weld the hollow fibers without inclusion of any continuous void. After removal of the jig, a housing seal member of PTFE was fitted on the welded portion of the hollow fibers, with gaps filled with pellets of the tetrafluoroethylene-hexafluoropropylene copolymer (melting point 270° C.). The bundle was then heated at 320° C. in a vacuum atmosphere so that the seal member was fixed to the bundle of hollow fibers. The bundle was then sliced at its portion covered by the seal member whereby an element with hollows of fibers opened was obtained. This element was immersed in ethanol for 2 hours for the purpose of hydrophilic treatment, followed by an air leak test which showed no leakage at the seal portion.

EXAMPLE 6

Dipping treatment was conducted in the same manner as Example 5 except that in an aqueous dispersion (solid content 50 wt %, viscosity 250 cp, specific gravity 1.4) of tetrafluoroethylene-perfluoroalkylvinylether copolymer (melting point about 310° C.) was used. The bundle of hollow fibers, coated by a uniform resin coating membrane, was fixed to the center of a housing seal member, and the gaps between adjacent hollow fibers, as well as the gaps between the hollow fibers and the seal member, were filled with a powder of tetrafluoroethylene-perfluoroalkylvinyl copolymer (melting point 310° C.) with the aid of a vibrator. The hollow fiber bundle was then placed in a vacuum container of a stainless steel so as to be heated at 320° C. in a vacuum atmosphere, whereby the resin was molten to weld the end of the hollow fiber bundle to the housing seal member. Then, by slicing the portion of the bundle fixed to the seal member, an element with the hollows of fibers opened was obtained. The thus obtained element was immersed for 2 hours in ethanol for hydrophilic treatment followed by an air leak test in which no leakage was recognized.

EXAMPLE 7

Figure 10:
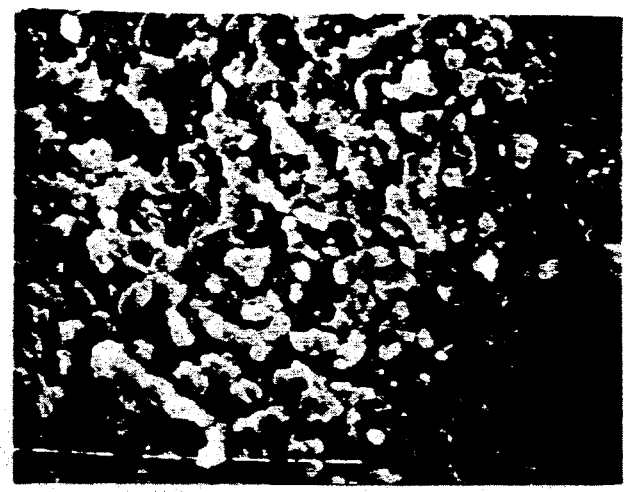
FIG. 10 shows a scanning electronic microscopic photograph (magnification 2400) of the surface of a porous membrane of Example 7 which has been kept in direct contact with a coagulation liquid.
Figure 11:
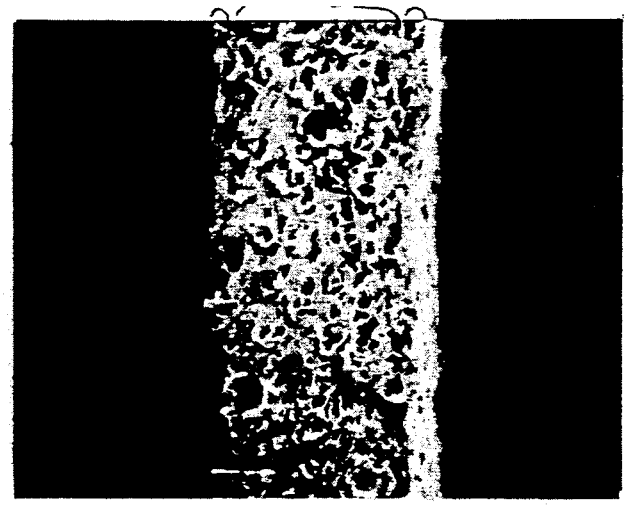
FIG. 11 shows a scanning electronic microscopic photograph (magnification 160) of the structure exhibited by a sectional surface of the porous membrane of Example 7.
Figure 12:
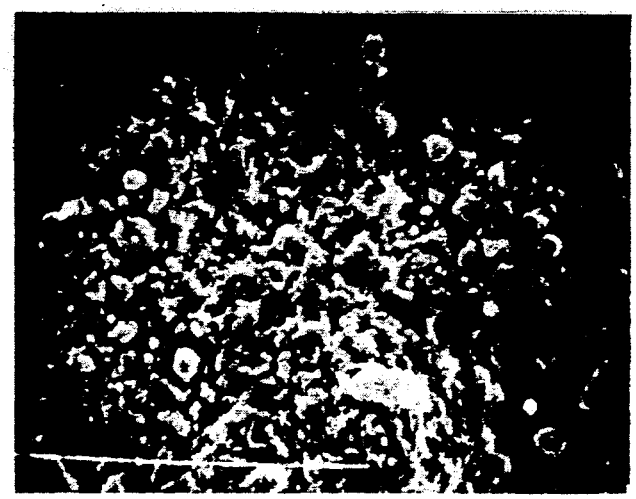
FIG. 12 shows a scanning electronic microscopic photograph (magnification 2400) of the surface of the porous membrane of Example 7 which has been kept in contact with a glass sheet.

A uniform mixture liquid was prepared by dissolving, in 950 parts of refined water, 50 parts of sodium alginate (produced by Nakarai Kagaku-sha, 300 cps), 20 parts of calcium carbonate (produced by Nakarai Kagaku-sha, special grade reagent) and 12 parts of silicone oil (SH-200 produced by Toray Silicone), and blending them at 70° C. Then, 200 parts of an aqueous PTFE dispersion (D-2 produced by Daikin: solid content 61 wt %, surfactant content 5.7 wt %) was added to the above-mentioned mixture liquid and the mixture was stirred at 70° C. whereby a uniform original liquid was obtained. This original liquid showed a viscosity of about 420 poise at 40° C. The original liquid was spread on a glass sheet and was dipped without delay in a 40 wt % aqueous solution of calcium chloride heated to 40° C. and kept in this solution for 5 minutes. The glass sheet was then dipped in water of the room temperature, whereby a flat sheet-like membrane was formed. The membrane was then heat-treated at 340° C. for 30 minutes in a hot-air oven and was then kept whole overnight in a room-temperature mixture liquid containing about 70 wt % of sulfuric acid and about 30 wt % of nitric acid so as to remove the sodium alginate, the silicone oil, denaturation products thereof formed as a result of the heat treatment, and the calcium carbonate. Then, the membrane was rinsed with water to become a porous membrane. FIGS. 10, 11 and 12 show the structure of the thus obtained porous membrane. As will be understood from these Figures, the membrane had a fine structure layer with a surface 1a contacted the coagulation liquid and having pores of a mean pore size of 0.5 $\mu$ and a thickness of 3 $\mu$, another fine structure layer with a surface 1b contacted the glass sheet and having pores of a mean pore size of 0.3 $\mu$ and a thickness of 3 $\mu$, and an intermediate support layer having pores of 3 to 15 $\mu$ and a thickness of 190 $\mu$.

The membrane had a porosity of about 60%, while the thickness of this membrane in wetted state was about 200 $\mu$. The permeability to purified water was 5800 ml/m²·hr·mmHg. A permeability performance test conducted with a 5% aqueous solution of albumin showed a water-permeability of 480 ml/m²·hr·mmHg and an albumin blocking rate of about 3%.

EXAMPLE 8

Figure 13:
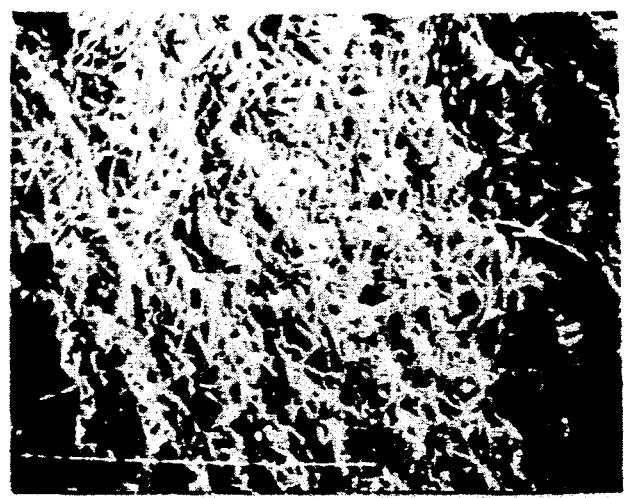
FIG. 13 shows a scanning electronic microscopic photograph (magnification 2400) of the structure of the outer surface of a porous hollow fiber membrane of Example 8.
Figure 14:
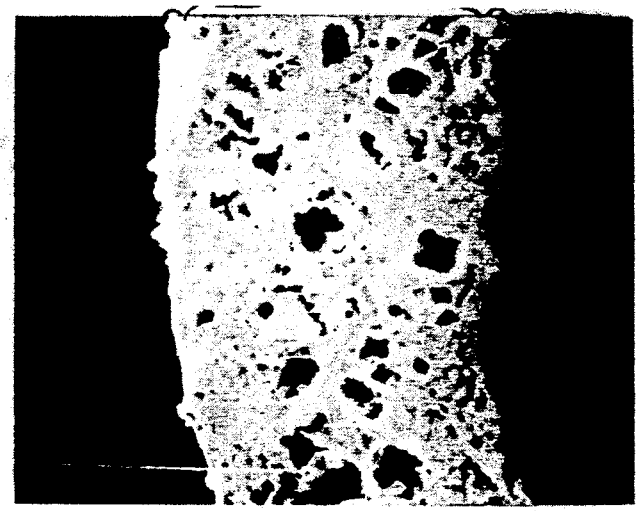
FIG. 14 shows a scanning electronic microscopic photograph (magnification 560) of the structure exhibited by a sectional surface of the porous hollow fiber membrane of Example 8.
Figure 15:
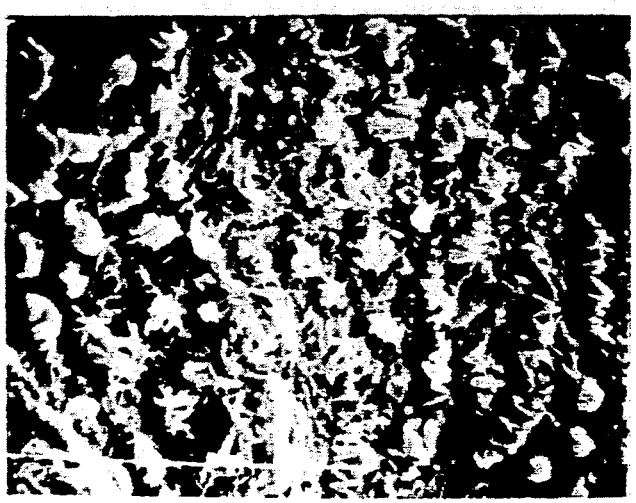
FIG. 15 shows a scanning electronic microscopic photograph (magnification 2400) of the structure of the inner surface of the porous hollow fiber membrane of Example 8, in which 1a and 1b denote fine structure layers and 2 denotes a support layer.

The original liquid used in Example 7 was extruded through a hollow fiber spinneret of 40° C. together with a core liquid which was about 10 wt % aqueous solution of calcium chloride. The extruded liquid was made to run 5 cm through the air and was introduced into a coagulating bath of about 50° C. consisting of about 40 wt % aqueous solution of calcium chloride so as to be coagulated. The fiber thus formed by coagulation was rinsed with water and was wound up at a speed of 20 m/min. The thus formed fiber was heat-treated at 340° C. for 30 minutes in a hot air oven and was then kept whole through a night in a mixture liquid of the room temperature containing about 70 wt % of sulfuric acid and about 30 wt % of nitric acid, so as to remove the sodium alginate, the silicone oil, the denaturation products formed therefrom as a result of the heat-treatment, and the calcium carbonate. The fiber was then rinsed with water to wash away any residue, whereby a porous membrane of hollow fiber was obtained. The structure of this membrane is shown in FIGS. 13, 14 and 15. As will be seen from these Figures, the membrane had a fine structure layer providing an outer surface 1a of the membrane and having pores of a mean pore size of 0.5 $\mu$ and a thickness of about 2 $\mu$, another fine structure layer presenting the inner surface 1b and having a mean pore size of 0.8 $\mu$ and a thickness of about 2 $\mu$, and an intermediate support layer having a multiplicity of pores of 1 to 15 $\mu$ and a thickness of about 90 $\mu$.

This hollow fiber membrane had a porosity of about 50%, as well as an inside diameter of about 360 $\mu$ and a thickness of about 95 $\mu$ in wetted condition. The permeability to purified water was 450 ml/m²·hr·mmHg, while the permeation performance test conducted with 5% albumin aqueous solution showed a water-permeability of 90 ml/m²·hr·mmHg and an albumin blocking rate of about 2%.

COMPARISON EXAMPLE 2

A flat sheet membrane and a hollow fiber membrane were prepared in the same manners as in Examples 7 and 8, except that the heat-treating temperature was changed to 310° C. These membranes were kept whole through a night in a room-temperature mixture liquid containing about 70 wt % of sulfuric acid and about 30 wt % of nitric acid so as to remove the sodium alginate, the silicone oil, the denaturation products thereof formed as a result of the heat-treatment and the calcium carbonate. After the removal of these substances, the membranes could not support themselves and collapsed.

EXAMPLE 9

Figure 16:
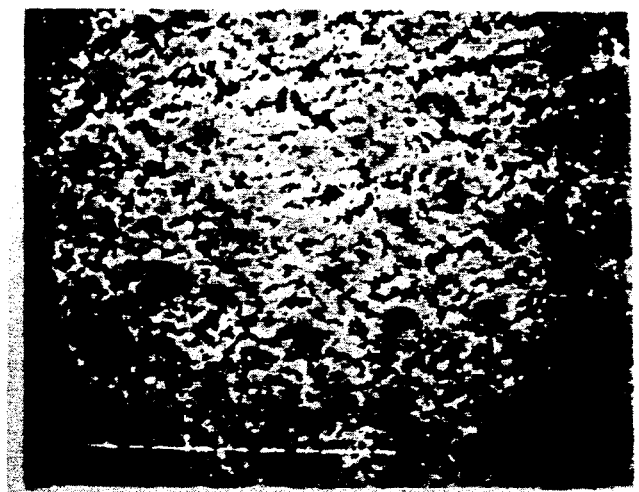
FIG. 16 shows a scanning electronic microscopic photograph (magnification 1600) of the surface-of a porous membrane of Example 9 which has been kept in direct contact with a coagulation liquid.
Figure 17:
FIG. 17 shows a scanning electronic microscopic photograph (magnification 560) of the structure exhibited by a sectional surface of the porous membrane of Example 9.
Figure 18:
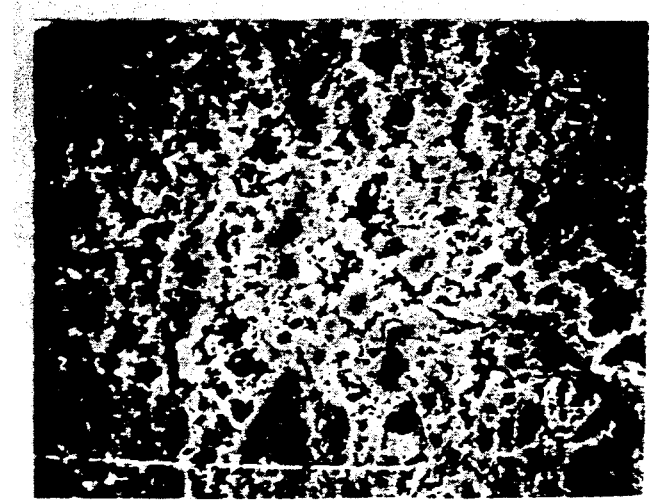
FIG. 18 shows a scanning electronic microscopic photograph (magnification 1600) of the surface of the porous membrane of Example 9 which has been kept in contact with a glass sheet.

A uniform mixture liquid was prepared by dissolving, in 950 parts of refined water, 50 parts of sodium alginate (produced by Nakarai Kagaku-sha, 300 cps), 250 parts of barium sulfate (X-ray contrast media Baritop, produced by Sakai Kagaku Kogyo) and 12 parts of silicone oil (SH-200 produced by Toray Silicone), and blending them at 35° C. Then, 200 parts of an aqueous PTFE dispersion (D-2 produced by Daikin: solid content 61 wt %, surfactant content 5.7 wt %) was added to the above-mentioned mixture liquid and the mixture was stirred at 35° C. whereby a uniform original liquid was obtained. This original liquid showed a viscosity of about 420 poise at 30° C. The original liquid was spread on a glass sheet and was dipped without delay in a 40 wt % aqueous solution of calcium chloride heated to 40° C. and kept in this solution for 5 minutes. The glass sheet was then dipped in water of the room temperature, whereby a flat sheet-like membrane was formed. The membrane was then heat-treated at 340° C. for 30 minutes in a hot-air oven and was then kept whole overnight in a room-temperature mixture liquid containing about 70 wt % of sulfuric acid and about 30 wt % of nitric acid so as to remove the sodium alginate, the silicone oil, denaturation products thereof formed as a result of the heat treatment, and the barium sulfate. Then, the membrane was rinsed with water and bi-axially drawn at a ratio of 1.5 to become a porous membrane. FIGS. 16, 17 and 18 show the structure of the thus obtained porous membrane. As will be understood from these Figures, the membrane had a fine structure layer with a surface 1 contacted the coagulation liquid and having pores of a mean pore size of 0.6 $\mu$ and a thickness of about 2 μ, and a support layer having pores of 1 to 6 μ and a thickness of 108 μ.

The membrane had a porosity of about 60%, while the thickness of this membrane in wetted state was about 110 82 . The permeability to purified water was 11,800 ml/m²·hr·mmHg. A permeability performance test conducted with a 5% aqueous solution of albumin showed a water-permeability of 140 ml/m²·hr·mmHg and an albumin blocking rate of about 44%.

EXAMPLE 10

Figure 19:
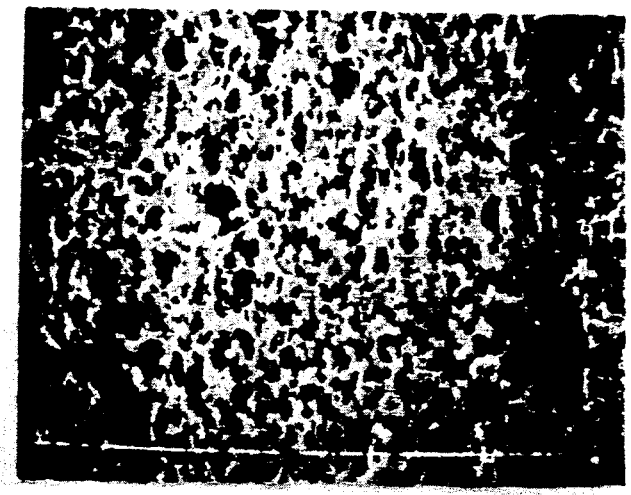
FIG. 19 shows a scanning electronic microscopic photograph (magnification 4000) of the structure of the inner surface of the porous hollow fiber membrane of Example 10.
Figure 20:
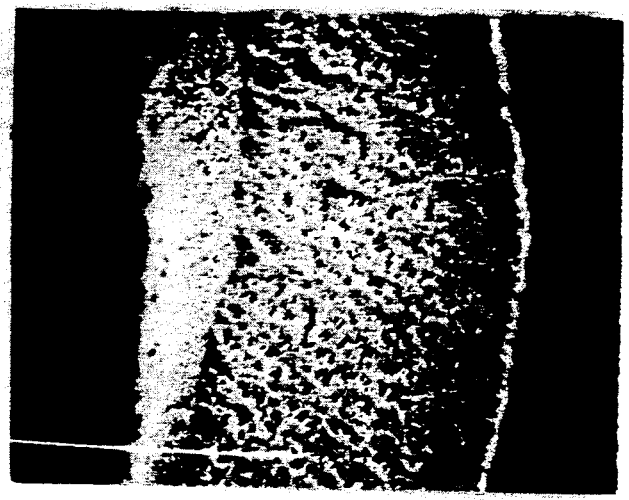
FIG. 20 shows a scanning electronic microscopic photograph (magnification 560) of the structure exhibited by a sectional surface of the porous hollow fiber membrane of Example 10.
Figure 21:
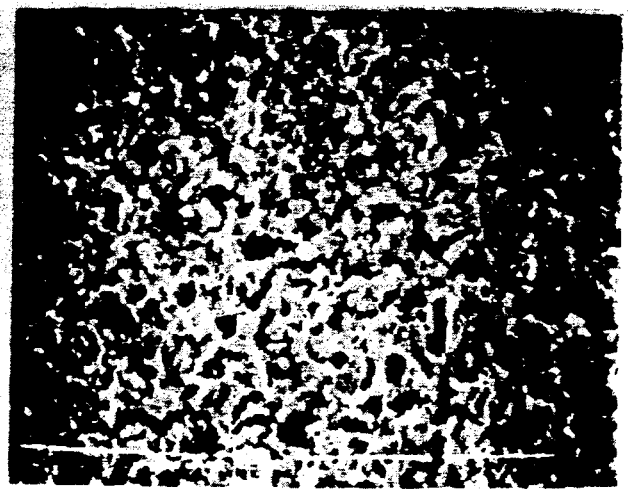
FIG. 21 shows a scanning electronic microscopic photograph (magnification 4000) of the structure of the outer surface of a porous hollow fiber membrane of Example 10.

The original liquid used in Example 9 was extruded through a hollow-fiber spinneret of 30° C. together with a core liquid which was about 10 wt % aqueous solution of calcium chloride. The extruded liquid was made to run 5 cm through the air and was introduced into a coagulating bath of about 40° C. consisting of about 40 wt % aqueous solution of calcium chloride so as to be coagulated. The fiber thus formed by coagulation was rinsed with water and was wound up at a speed of 20 m/min. The thus formed fiber was heat-treated at 340° C. for 30 minutes in a hot air oven and was then kept whole through a night in a mixture liquid of the room temperature containing about 70 wt % of sulfuric acid and about 30 wt % of nitric acid, so as to remove the sodium alginate, the silicone oil, the denaturation products formed from the sodium alginate and the silicone oil as a result of the heat-treatment, and the barium sulfate. The fiber was then rinsed with water to wash away any residue and then drawn at a ratio of 1.5, whereby a porous membrane of hollow fiber was obtained. The structure of this membrane is shown in FIGS. 19, 20 and 21. As will be seen from these Figures, the membrane had numerous fine pores of a mean pore size of 0.7 μ.

This hollow fiber membrane had a porosity of about 50%, as well as an inside diameter of about 360 μ and a thickness of about 95 μ in wetted condition. The permeability to purified water was 1740 ml/m²·hr·mmHg, while the permeation performance test conducted with 5% albumin aqueous solution showed a water-permeability of 140 ml/m²·hr·mmHg and an albumin blocking rate of about 51%.

COMPARISON EXAMPLE 3

A flat sheet membrane and a hollow fiber membrane were prepared in the same manners as Examples 9 and 10, except that the heat-treating temperature was changed to 310° C. These membranes were kept whole overnight in a room-temperature mixture liquid containing about 70 wt % of sulfuric acid and about 30 wt % of nitric acid so as to remove the sodium alginate, the silicone oil, the denaturation products thereof formed as a result of the heat-treatment, and the barium sulfate. After the removal of these substances, the membranes could not support themselves and collapsed.

We claim:

1. A method of producing a porous membrane comprising:
   forming a membrane having a hollow fiber construction by coagulation of a dispersion of polytetrafluoroethylene resin in a solution of about 30 to 200% by weight of a film-forming polymer dissolved in said solution based on the weight of the polytetrafluoroethylene resin;
   heat-treating said membrane at a temperature not lower than the melting point of said resin; and
   removing said film-forming polymer.

2. A method of producing a porous membrane according to claim 1, wherein said polytetrafluoroethylene resin is selected from the group consisting of a tetrafluoroethylene homopolymer, a tetrafluoroethylene-perfluoroalkylvinylether copolymer, a tetrafluoroethylene-hexafluoropropylene copolymer, a tetrafluoroethylene-ethylene copolymer, and a mixture of these polymers.

3. A method of producing a porous membrane according to claim 1, wherein the size of the resin particles in said polytetrafluoroethylene resin dispersion is not greater than 1 μ.

4. A method of producing a porous membrane according to claim 1, wherein said film-forming polymer is selected from a group consisting of a polyvinyl alcohol, a sodium alginate and a mixture thereof.

5. The method of claim 1, wherein the porous membrane resulting from said step of removing said film-forming polymer is in the form of a hollow fiber.

6. The method of claim 1, wherein the amount of film-forming polymer is in the range of from 10 to 200 wt %, based on the polytetrafluorethylene resin.

7. The method of claim 1, wherein the amount of film-forming polymer is in the range of from 30 to 100 wt %, based on the polytetrafluoroethylene resin.

8. A method of producing a porous membrane comprising:
   forming a membrane having a hollow fiber construction by coagulation of a dispersion of polytetrafluorethylene resin in a solution of a film-forming polymer dissolved in said solution and about 30 to 700% by weight of finely dispersed additives other than said resin,
   heat-treating said membrane at a temperature not lower than the melting point of said resin; and
   removing said additives and said film-forming polymer.

9. A method of producing a porous membrane according to claim 1, wherein said finely dispersible additive is selected from a group consisting of inorganic particles, fine resin particles, heat-resistant organic matters and their mixtures.

10. The method of claim 8, wherein the porous membrane resulting from said step of removing said additives and said film-forming polymer is in the form of a hollow fiber.

11. The method of claim 8, wherein the amount of film-forming polymer is in the range of from 10 to 200 wt %, based on the polytetrafluoroethylene resin.

12. The method of claim 8, wherein the amount of film-forming polymer is in the range of from 30 to 100 wt %, based on the polytetrafluoroethylene resin.

13. A method of producing a separator comprising:
   forming a membrane having a hollow fiber construction by coagulation of a dispersion of polytetrafluoroethylene resin in a solution of a fiber-forming polymer dissolved in said solution;
   heat-treating said membrane at a temperature not lower than the melting point of said resin; and
   effecting the following steps (1) and (2) in combination on the heat-treated membrane:
   (1) removing said fiber-forming polymer to provide the membrane in the form of a hollow fiber, and
   (2) mounting said membrane in a case so as to form independent flow channels in said case and welding and fixing an end of said case with a fluororesin.

14. The method of claim 13, wherein the amount of film-forming polymer is in the range of from 10 to 200 wt %, based on the polytetrafluoroethylene resin.

15. The method of claim 13, wherein the amount of film-forming polymer is in the range of from 30 to 100 wt %, based on the polytetrafluoroethylene resin.

* * * * *